(12) United States Patent
Pardon et al.

(10) Patent No.: US 8,005,805 B2
(45) Date of Patent: Aug. 23, 2011

(54) DECENTRALIZED, DISTRIBUTED INTERNET DATA MANAGEMENT

(76) Inventors: Guy Pardon, Zemst (BZ); Gustavo Alonso, Zurich (CH)

(*) Notice: Subject to any disclaimer, the term of this patent is extended or adjusted under 35 U.S.C. 154(b) by 935 days.

(21) Appl. No.: 10/707,644

(22) Filed: Dec. 29, 2003

(65) Prior Publication Data
US 2004/0244004 A1  Dec. 2, 2004

Related U.S. Application Data

(62) Division of application No. 09/682,969, filed on Nov. 2, 2002, now Pat. No. 6,671,686.

(60) Provisional application No. 60/245,374, filed on Nov. 2, 2000.

(51) Int. Cl.
  *G06F 7/00* (2006.01)
  *G06F 17/00* (2006.01)
(52) U.S. Cl. ........................................ 707/703
(58) Field of Classification Search .............. 707/100, 707/607, 703, 999.003
See application file for complete search history.

(56) References Cited

U.S. PATENT DOCUMENTS

| | | | | |
|---|---|---|---|---|
| 5,193,188 A | * | 3/1993 | Franaszek et al. | 707/8 |
| 5,287,501 A | | 2/1994 | Lomet | 707/202 |
| 5,504,899 A | * | 4/1996 | Raz | 707/10 |
| 5,524,205 A | | 6/1996 | Lomet et al. | 714/16 |
| 5,701,480 A | * | 12/1997 | Raz | 718/101 |
| 5,734,897 A | | 3/1998 | Banks | 707/2 |
| 5,806,065 A | | 9/1998 | Lomet | 707/18 |
| 5,806,074 A | | 9/1998 | Souder et al. | 707/201 |
| 5,870,763 A | | 2/1999 | Lomet | 707/202 |
| 5,933,838 A | | 8/1999 | Lomet | 707/202 |
| 5,946,698 A | | 8/1999 | Lomet | 707/202 |
| 6,067,550 A | | 5/2000 | Lomet | 707/202 |
| 6,076,078 A | * | 6/2000 | Camp et al. | 705/65 |

(Continued)

FOREIGN PATENT DOCUMENTS

EP  0457109 A2  5/1991

(Continued)

OTHER PUBLICATIONS

Bradshaw, Dexter, Per-Ake Larson and Jacob Slonim. "Transaction Scheduling in Dynamic Composite Multidatabase Systems." IBM Centre for Advanced Studies Conference Proceedings of the 1995 Conference of teh Centre for Advanced Studies on Collaborative Research. IBM Press: 1995.*

Ouyang et al., CTP: An Optimistic Commit Protocol for Conversatonal Transactions, Internet Article, Online!: URL: www.hpl.hp.com/techreports/2001HPL-2001-20.pdf, Jan. 26, 2001, pp. 1-11.

(Continued)

*Primary Examiner* — Kimberly Lovel
(74) *Attorney, Agent, or Firm* — Oppedahl Patent Law Firm LLC

(57) ABSTRACT

In a light-weight transactional system architecture, each component providing a service performs its own scheduling and transaction management. An invocation of one of these services (through remote method invocation) results in the creation of a local transaction (child of the invoking transaction and parent of any transaction that might be triggered by invoking the services of other servers). The information that is required to build a global composite transaction is implicitly added by the system to each call. Each transaction is, however, independently handled at each server. That is, the servers neither communicate among themselves nor rely on a centralized component to make scheduling or recovery decisions. In this way, components can be dynamically added or removed from the system without compromising correctness. Regardless of the configuration, the system according to the invention guarantees that transactions executed over these servers are correct and recoverable at a global and local level.

15 Claims, 6 Drawing Sheets

U.S. PATENT DOCUMENTS

| | | | | |
|---|---|---|---|---|
| 6,151,607 | A | * | 11/2000 | Lomet .......................... 707/202 |
| 6,182,086 | B1 | | 1/2001 | Lomet et al. ................... 707/202 |
| 6,233,585 | B1 | * | 5/2001 | Gupta et al. ............... 707/103 R |
| 6,272,515 | B1 | * | 8/2001 | Fouquet ........................ 718/101 |
| 6,298,478 | B1 | * | 10/2001 | Nally et al. ................... 717/170 |
| 6,457,065 | B1 | * | 9/2002 | Rich et al. ..................... 719/328 |
| 6,640,244 | B1 | * | 10/2003 | Bowman-Amuah .......... 709/207 |
| 6,714,962 | B1 | * | 3/2004 | Helland et al. ................ 709/203 |
| 7,290,056 | B1 | * | 10/2007 | McLaughlin, Jr. ............ 709/230 |

FOREIGN PATENT DOCUMENTS

| | | |
|---|---|---|
| EP | 0805394 A1 | 4/1997 |

OTHER PUBLICATIONS

Pardon et al., CheeTah: a Lightweight Transaction Server for Plug-and-Play Internet Data Management. Proceedings of the 26th VLDB Conference, Sep. 10, 2000, pp. 210-219.

Schumann et al., Recovery-Management in the RelaX Distributed Transaction Layer, Proceedings of the Symposium on Reliable Distributed Systems, Oct. 10, 1989, pp. 21-28, vol. SYMP. 8.

Härder T, Rothermel K: "Concurrency Control Issues in Nested Transactions" VLDB Journal, vol. 2, No. 1, 1993, pp. 39-74.

European Search Report; search completed May 27, 2010.

* cited by examiner

DECENTRALIZED, DISTRIBUTED INTERNET DATA MANAGEMENT

CROSS REFERENCE TO RELATED APPLICATIONS

This application is a divisional of U.S. application Ser. No. 09/682,969, filed Nov. 2, 2002, now U.S. Pat. No. 6,671,686, incorporated herein by reference, which claims priority from U.S. application No. 60/245,374, filed Nov. 2, 2000, which application is hereby incorporated herein by reference.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Data management is easy if components of the data management system are in a static configuration and if there is a centralized monitor. Data management is not easy at all if there is no centralized monitor and if there is no enforcement of a static configuration of the components.

In the era of the Internet, application areas such as business-to-business and business-to-consumer electronic commerce are important for information systems, as well as for economics. Essential topics in this context are, among others, information retrieval (search engines of all kinds), information theory (cryptography and payment protocols), and semi-structured data (XML). All these technologies try to facilitate the way in which distributed systems can co-operate across networks in general and the Internet in particular. It is particularly fruitful to address "transactions," or ways to allow multiple users to manipulate data concurrently. It is instructive to describe systems which are called "composite systems." In a composite system, a collection of different, autonomous information systems interact transactionally. As it turns out, existing solutions in this area are far from ideal and are based on assumptions that might no longer be valid in many present-day systems.

In a composite system, there is a hierarchy of invocation calls between different services across a variety of components. In a typical system, different and independent servers (from different organizations) invoke each others' services to accomplish an e-commerce transaction. For instance, buying a complex product involves retrieving the necessary parts to assemble it, as well as planning the assembly and arranging the shipment procedure. Each of these activities is a service offered at a distinct server in the distributed system. For instance, checking the stock for availability of each part is done in an Inventory control system. There, lack of availability is translated into yet another invocation of a third party server, namely a supply e-commerce interface. Yet another invocation arises because (in a typical system) customers are allowed to trace the status of their orders. Through a manufacturing control system which is yet another server at another location, queries concerning the order status can be issued, and again translated into delegated calls somewhere else. Thus, in principle each component is implemented as an independent entity residing in a different location (over a LAN or a WAN as, e.g., the electronic commerce interface).

These components invoke the services provided by other components (FIG. 1) forming an arbitrary nested client-server hierarchy in which increasing levels of abstraction and functionality can be introduced (FIG. 2). As a matter of terminology, the most important aspects of each component are the application logic layer (a server) and a resource manager (usually a database), that is accessed by the former.

The challenge is to design and implement an inherently decentralized and advanced transactional mechanism. This mechanism should allow combining such components in any possible configuration, so that transactions can be executed across the resulting system guaranteeing correct (transactionally correct) results, even if the configuration is dynamically altered. It is crucial for these components to remain independent of each other, that is, there should not be (the need for) a centralized component controlling their behavior. Additionally, nested transactions should be supported, because of the inherent distributed nature, leaving room for alternatives on failure of a particular remote call. For instance, if a particular e-commerce interface is down, then another supplier can be tried.

To see why these characteristics are important, it suffices to look at the Internet: servers may be unreachable, new servers appear without notice, and the nature of the Internet itself already excludes the possibility of relying on a fixed configuration between the different systems that cooperate. For these same reasons, such a system should also be able to cope with failing calls in a flexible and elegant way: if a server cannot be reached at a given moment, it should be possible to try an alternative service. One of the golden rules in electronic commerce is to maximize customer satisfaction by minimizing the number of service denials. This suggests that remote failures be dealt with in the service itself, without making them visible to the customer invoking the service. Finally, there is no reason why different remote service invocations within the same task should not be executed in parallel (where it is possible to do so), thereby minimizing response time. However, as will become clear in the discussion that follows, hardly any of these desirable properties is feasible with existing solutions.

Flat transactions. The transactional model for (distributed) computing has been around for many years and it is considered a well-established and mature technology. The basis of the classical transaction theory are the four ACID properties (atomicity, consistency, isolation and durability) that define a computation as being transactional. Within the scope of this work, the influence of distribution and autonomy on isolation and atomicity will be of particular interest.

Although there is nothing fundamentally wrong with ACID-ity, most of the transactional technology in use today has been developed before the Internet grew into what it is today. Consequently, in today's transaction systems, the quality of being "distributed" appears as an "add-on" and not as an inherent feature. The term "flat transactions" refers to the fact that conventional transactions have no internal structure (no logical subparts) and that atomicity is implemented by aborting everything as soon as one operation fails. While this is fine for centralized systems, this model is not suitable for distributed architectures. In a distributed system, almost by definition, tasks have an internal structure where each remote call is a separate logic component. For instance, in case of remote failure, another node (or network route) could be used to solve the task. Thus, it seems inadequate to abort everything in a distributed computation simply because one server appears to be down at a given moment. Yet this is what flat transaction technology implies, thereby losing a big opportunity to improve services by exploiting properties of distributed architectures.

Flat transactions and distribution. The earliest applications of flat transactions were in the field of databases. Distributed transactions, along with distributed databases, were not seriously considered until the 1980's and early 1990's. Not surprisingly, this more or less coincides with the earlier stages of the global network. At that time, a lot of attention was devoted to various kinds of concurrency control techniques (such as strict two-phase locking and timestamps, to name a few) and how they could be reconciled with a distributed transactions system, i.e., in which a distributed or global transaction may have local transactions on multiple sites (although it was common to assume that each distributed transaction would have at most one local transaction on a given site).

One of the important conclusions of these research activities was that it suffices to have strict two-phase locking and two-phase commit on each node of a distributed database system to provide correct isolation and atomicity. Because strict two-phase locking already was, and still is, the basic technique that virtually every database system used for enforcing isolation, there has been no fundamental change in technology. Even today the flat transaction is pervasive, and systems have been enriched with the two-phase commit protocol to make them work in distributed environments. Thus, much of the work on distributed transactions and advanced transaction models in this context (focusing on techniques other than locking and how to avoid two-phase commit) turned out to be practically irrelevant.

A lot of work already exists concerning distributed commitment. An important theoretical fact is the impossibility of non-blocking consensus in asynchronous systems with communication or node failures. The prevailing protocol with acceptable message overhead has proven to be two-phase commit. Other protocols exist, such as three-phase commit, which tries to avoid blocking. However, it is more expensive in terms of messages exchanged and blocking is only avoided when no communication failures occur (which makes it impractical and expensive). In the two-phase commit protocol, distributed consensus is reached by two message rounds, under the supervision of a coordinator. In the first round, the coordinator asks each of the participating nodes whether it can agree with an eventual commit outcome. If the participant detects no local problem on behalf of the transaction, it votes yes, thereby giving up any local right to abort unilaterally (leaving the participant in the so-called in-doubt state). Otherwise, the vote will be no. The coordinator collects all votes, and only if all participants vote yes it will decide on global commit and, as the second round, send commit messages to everyone. If at least one participant did not reply with a yes vote (either because of timeout or because a "no" was received), then the coordinator decides on global abort and notifies, as the second round, any in-doubt participants. Of course, all this has to be done with the proper amount of logging (to survive crashes). When and how this logging is done, and how to use it during recovery is the main difference between the many variants that have been proposed.

Delicate problems arise in case nodes fail, especially if the coordinator fails while some nodes are in-doubt. This is the so-called blocking time window of the protocol, which is preferably kept as small as possible. Nevertheless, this window exists, and it is something that one has to live with. Within this context, the resulting architecture for distributed transactions is shown in FIG. 4. A number of RDBMS (DB1; DB2; DB3 in the example), also called resource managers in the literature, are subject to the coordination of a central transaction monitor (TM in the illustration). This TM is responsible for creating the transaction identifier and coordinating the two-phase commit protocol. A RDBMS is usually never invoked directly: instead, a server process is invoked (such as server1; server2; server3 in the example), and this process accesses the data. The reason for this is load balancing: by adding more server processes on more CPUs, the system can better distribute the load. Server processes can invoke each other (re-use each other's logic) as well as directly access their local RDBMS on behalf of some transaction with transaction identifier T. The identifier T is part of all communications within the system: both inter-server calls and RDBMS calls are aware of which T is being executed. For isolation, each RDBMS inspects incoming requests and sets locks based on the transaction identifier. This is where two-phase locking is enforced. Because there is only one transaction identifier for every transaction, different intra-transaction accesses to the same data will be allowed by every RDBMS involved. For atomicity, the transaction monitor runs a two-phase commit protocol between all resources involved, which again uses the transaction identifier to keep track of which operations to commit. Note that the transaction monitor is the only entity that knows the resources that are part of one given transaction.

Such a prior-art architecture does not favor decentralization. One of the aims of the invention is to eliminate the central role the transaction monitor plays. In the above example, there was only one transaction monitor process involved. As long as this assumption holds, and each server knows what other servers do (this point will be clarified below in a discussion of recursive client-server relationships), no serious anomalies arise if a distributed at transaction is used: in an ideal situation, with no failures and no concurrency, every transaction can be executed and will be correct. However, when large-scale distribution is considered, it is not realistic to assume a central coordinating entity that manages transactions: if multiple information systems interact transactionally, then more than one transaction monitor will be involved, an example of which is shown in FIG. 5. Because each transaction monitor works with its own policies for determining a transaction identifier, a global distributed transaction will have multiple and possibly different identities in each system. In FIG. 5, three organizations interact, each of them with their own transaction monitor (TMA; TMB; TMC in the example). Due to the different policies for identifiers, a mapping has to be performed when invocations cross organizational (and therefore transaction monitor) boundaries. In practice, one can consider two possibilities: the push model and the pull model, depending on where the mapping is maintained (on the caller side or on the callee side). In the particular case of the Internet, there have been some recent efforts to define a so-called transactional internet protocol (TIP) standard for doing this type of mapping. Nevertheless, irrespective of where or how it is done, information is lost in the process. For instance, FIG. 5 clearly shows that if a client invocation reaches serverC through the domains of two different transaction managers (TMA; TMB) then the two invocations of the same global transaction will be known to TMC as two different local transactions T2 and T4. If both calls need to access the same data, the resource manager will block one of them, thereby deadlocking the execution. The other option is that all transaction managers in the system use the same identifier for the work of the same client, but this is not usually how it works out.

This subtle but very limiting feature of current technology is due to the fact that existing systems are not required to recognize different parts of the same distributed transaction as one unit. Consequently, strict two-phase locking will treat them as different transactions and block one call accordingly. In distributed transaction processing, this problem is also known as the "diamond problem." One might argue that diamond problems are probably very rare, since they only happen on common data access through different invocation hierarchies. However, by definition, these accesses are done on behalf of the same client and therefore much more likely to happen in practice, simply because the different calls share the same context.

Robustness. Another problem with flat transactions and distribution concerns intra-transaction protection against remote failures. Indeed, aborting everything as soon as one operation fails may make sense for centralized databases, but on Internet systems failures do not merely depend on local effects, but also on the availability of remote sites. For example, something that is quite harmless to other Internet processes, such as momentary congestion in a data link, may lead to a more serious problem where two-phase commits (with possible timeouts) are being used. This suggests that a more robust model be used such as, for instance, a nested transaction model. In nested transactions a remote failure does not restrict locally started transactions from completing because the failure can be detected at execution time and one of a number of provided alternatives can be tried. One known commercial transaction monitor that provides nested transactions is a product called "Encina." Otherwise, nested transactions remain a theoretical curiosity.

Parallelism. The third and last problem with existing transactions is their restriction to serial execution within one transaction: multithreaded transactional applications are not allowed. This seems to be overly restrictive, especially when considering remote transactional calls on the Internet: if two entirely different sites are to be called, then there is no obvious reason why this should not be done in parallel. Although it would probably be possible to incorporate this feature into the flat model, it appears as a natural extension as soon as one moves into nested transaction models, as discussed below.

Nested transaction models. So far discussion has concentrated on the classical flat transaction model. The reason for this is that virtually no existing product or system will use anything else. More advanced and more elegant models exist, however. It must be kept in mind, however, that most of these concepts have never been implemented. Relevant to the subject are the different paradigms of nested transactions. There are many known variants, and a brief review of each of them now follows.

General characteristics of nested transactions. The term "nested" refers to the fact that a transaction can be (recursively) decomposed into subtransactions, parts that form a logically related subtask. In this way, a parent transaction can have multiple children, each child being a subtransaction. A key point is that a successful subtransaction only becomes permanent (i.e., committed) if all its ancestors succeeded as well, whereas the inverse does not hold: if a child fails, the parent is free to try an alternative task, thereby rescuing the global work. The advantages of doing this are twofold: firstly, a failure of a subtransaction clearly delimits the scope of the failed part, allowing a clear definition of alternative policies. Secondly, subtransactions define clear boundaries of isolation among parts of the same overall task. This can be exploited by the system to allow parallelism inside one and the same global transaction.

Closed nested transactions. In the closed nested paradigm, locks are acquired as in two-phase locking, but extra policies determine the behavior of subtransactions with respect to each other. More precisely, as soon as a subtransaction finishes, its locks are passed on to its parent. A child of that very same parent will inherit these locks whenever it needs access to the same data. Without this feature, children of the same parent could block each other, resulting in very impractical systems. It is this very characteristic that so far has made closed nested transactions unfit for practical use: no existing RDBMS supports lock inheritance. Indeed, implementing lock inheritance is difficult and expensive, even in a centralized system. The fact that distribution comes into play (that is, that systems nowadays are "distributed") makes it even more complicated. Practical evidence for this fact can be seen in Encina, the only existing product using nested transactions: upon configuring a server, it is necessary to choose a mapping mode that determines how different subtransactions are mapped to the underlying database transactions, thereby determining whether lock inheritance can be simulated or not. Indeed, there are essentially two policies:

1. Two subtransactions of a common parent transaction are mapped to different database transactions.
2. Two subtransactions of a common parent transaction are mapped to the same underlying database transaction.

In the first case conflicting subtransactions will block each other, which is the equivalent of no lock inheritance. In the second case, there is no isolation among parallel subtransactions. Furthermore, this mapping is implemented as a setup choice and cannot be changed dynamically based on the client's needs.

Open nested transactions. Open nested transactions differ from the closed variant in that the locks of a subtransaction are released as soon as that subtransaction is finished (either released entirely or replaced by a semantic lock, depending on the variant). If locks are released entirely, then there is hardly any guarantee about isolation nor about atomicity of the global transaction. When openness is introduced, practical systems (based on a commercial RDBMS) will have to use compensating tasks. These are tasks that reverse the effects of a given task, after that task has released its locks and has committed. This is necessary because in current databases the only way to instruct a RDBMS to release locks is by committing the transaction. In order to make a compensation correct (so that it really reverses all updates correctly), certain restrictions must be imposed. Therefore, in most cases, some kind of higher-level semantic lock has to be maintained until compensation may no longer happen (when the transaction has been terminated at all sites). As a simple example, consider the following: a bank has an open nested system in charge of executing transfers between different accounts. Suppose that a general policy rule states that no account should be allowed to have a negative balance. Transferring money from one account (A) of bank BankA to a different and empty account (B, in another bank BankB) consists of two steps:

1. The amount Am to be transferred is added to account B. This is implemented as an open subtransaction of the transfer operation, and is immediately committed in BankB. In this way, the new balance is exposed to concurrent activities.
2. Next, the same amount is taken from account A. However, let us assume that, due to a communication failure, this step fails.
3. To cancel the entire operation, the amount Am is withdrawn again from account B. In isolated circumstances this system works fine, but not if different and concurrent activities are going on. Indeed, it is easy to see that if the owner of account B withdraws money between steps 1 and 3, the final balance of his account might be end up negative. Therefore, in this case, a lock should prevent any such withdrawals as long as step 3 may still be necessary. To date, no existing implementation of open nested transactions is readily available.

Multilevel transactions. This is a variant of open nested transactions, where the transaction structures are perfectly balanced trees, all of the same depth. This allows the execution to be decomposed into layers or levels. The prime emphasis was not so much on distribution and autonomy, but on elegance and composition of primitive operations into more complex ones. The principles of multilevel transactions can be stated in three rules:

1. abstraction hierarchy: a hierarchy of objects exists, along with their operations.
2. layered abstraction: objects of layer N are completely implemented by using operations of layer N−1.
3. discipline: there are no shortcuts from layer N to layers lower than N−1.

Just as in open nested transactions, multilevel transactions rely on the existence of a compensation for each operation on any layer. Moreover, the compensations on layer N−1 are scheduled by layer N or higher, which introduces a recovery dependency across layers. These facts underline the dependence on a central system, or on a clearly structured and "trusted" (in the sense of a reliable client layer) federation rather than autonomous and arbitrary distribution. Although originally proposed as a model for federated databases as well, the layered approach and the recovery dependency make this paradigm less favorable for the more general case of composite systems.

Existing industrial efforts for Internet transaction processing. There are a few existing approaches concerning transaction management for Internet architectures. These include the following.

Enterprise Java Beans. This is the Java vision for distributed transaction processing applications. Enterprise Java Beans is a standard, meaning that it consists of specifications rather than implementations. The main objective is to provide a portable way of writing transactional applications. By taking all server-specific issues out of the application (such as transaction management, pooling of resources, swapping of inactive components), it is possible to create portable applications (so-called Beans, the Java terminology for a software component). The key idea is that all these components have to adhere to a standardized way of interacting with the server environment. In practice, this means that a component has a set of predefined methods that are called by the server in case of important events. For instance, before swapping out an inactive component, this component is notified by calling its method ejbPassivate( ), whose implementation should discard any volatile data and synchronize the component's database state. The whole concept of this technology is thus oriented towards component-based server applications, and the contract between a component and the server can be very complex. As such, it is orthogonal to the objectives discussed here: although EJB mainly targets applications with transactional aspects, the issue of transaction management itself is left open. In that approach, some of the problems with distributed transactions are recognized, but no attempts are made to solve them. Finally, with JavaBeans, nested transactions are not currently supported.

CORBA Object Transaction Service. As part of the global CORBA standard, the OTS specification deals with transactions in CORBA environments. The objective is to standardize the way in which distributed objects can interact with a transaction manager, and how different transaction managers can communicate with each other. However, it is not specified how transaction management can be done. Rather, the interfaces between application and transaction manager, between transaction manager and resources (databases) and between different transaction managers are the main scope of this standard. Nested transactions are optional, and the interfaces exist. However, the internal aspect of how this transaction management should or could be done is left open. Only one ORB is known that incorporates nested transactions: Orbix' OTM, whose functionality is based on the above-mentioned Encina. It should be mentioned that the OTS standard does not properly address communication failures; although efforts to address such failures have been made, those efforts can be shown to be insufficient.

Transaction Internet Protocol (TIP). The transactional internet protocol (TIP) is another industrial standardization effort dealing with standardizing two-phase commit over TCP/IP networks. As such it specifies how different transaction monitor instances could co-ordinate a transaction's two-phase commit outcome by using a character stream connection. The effort is implicitly oriented towards at transactions (which is reflected in the specification's protocols and interfaces) and, in most cases, towards point-to-point interactions rather than multiple accesses through different network paths. As such, it is not sufficient for the type of composite systems addressed herein.

Returning again to some of the problems requiring solution, it is a well-known fact that distributed agreement (of which two-phase commit is an example) can always lead to blocking if both node failures and communication failures are possible. In those cases, parts of a distributed system are left in an indecisive (in-doubt) state. For data sources, this implies that locks have to be kept indefinitely, leading to serious availability problems.

It would be desirable to have a system with exactly (open) nested transactions, decentralization, communication failure tolerance, and avoidance of diamond cases. It would be extremely desirable to have a system in which are provided completely autonomous components that, without any centralized coordination, and interact transactionally. It would be desirable to have a system in which components can be combined in any configuration and can be dynamically added or removed without compromising correctness. It would be desirable for such a system not to require a very large infrastructure. Finally, it would be desirable for such a system to have performance at least comparable to the performance of prior-art systems.

SUMMARY OF INVENTION

In the system according to the invention, components are autonomous and completely decentralized components. The system provides nested characteristics which improve parallelism (response times) and fault tolerance. The system provides local transaction management: no matter how components invoke each other, and how complex the execution of a transaction, the system ensures correctness in all cases by using only local knowledge at each component. In an exemplary system, completely autonomous components act as application servers that invoke each others' services to implement increasingly complex application logic. The components can be used as wrappers for legacy applications or as infrastructure for transactional agents working across the Internet.

In the system according to the invention, a light-weight architecture is provided, where each component is in itself its own advanced mini-transaction processing monitor. To accomplish this, the system is most readily implemented as a set of Java classes. The resulting architecture is as follows. In a composite system (such as that of FIG. 2), each server is an independent component performing its own scheduling and transaction management. These servers are built using Java and inheriting from the classes provided by the system according to the invention. The interface to each server defines the services it implements. An invocation of one of these services (through RMI or "remote method invocation") results in the creation of a local transaction (child of the invoking transaction and parent of any transaction that might be triggered by invoking the services of other servers). Each transaction is a thread that can, for example, invoke SQL statements in a local database (directly connected to that server) as well as services offered by other servers. All the information that is required to build a global composite transaction is implicitly added by the system to each call. Each transaction is, however, independently handled at each server. That is, the servers neither communicate among themselves nor rely on a centralized component to make scheduling or recovery decisions. In this way, components can be dynamically added or removed from the system without compromising correctness. All a new server needs to know is the interface and address of the servers it will invoke. Regardless of the configuration, the system according to the invention guarantees that transactions executed over these servers will be correct (serializable) and recoverable at a global and local level.

BRIEF DESCRIPTION OF DRAWINGS

The invention will be described with respect to drawings, of which.

DETAILED DESCRIPTION

Figure 1:
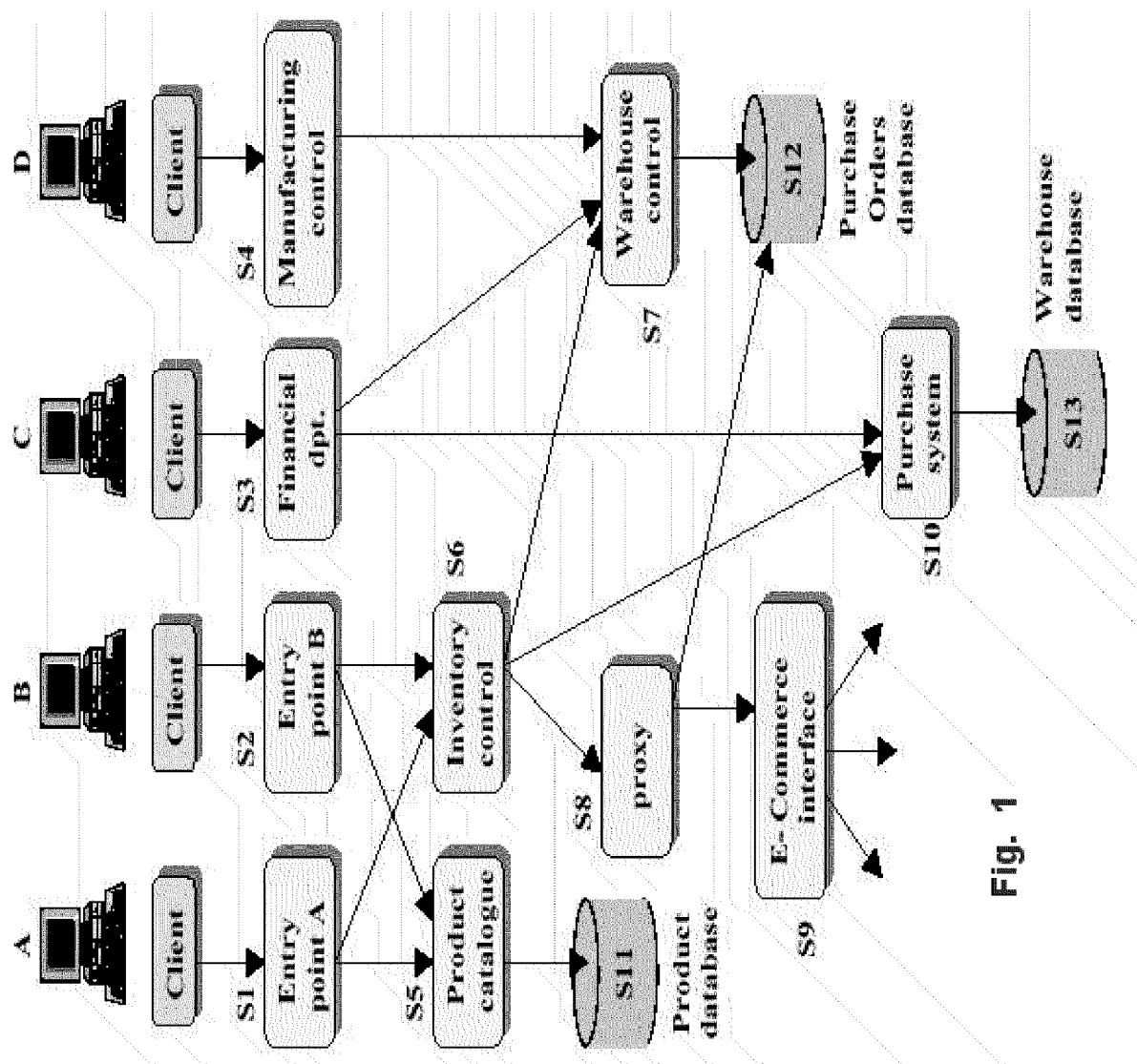
FIG. 1 shows a typical composite data management system.
Figure 2:
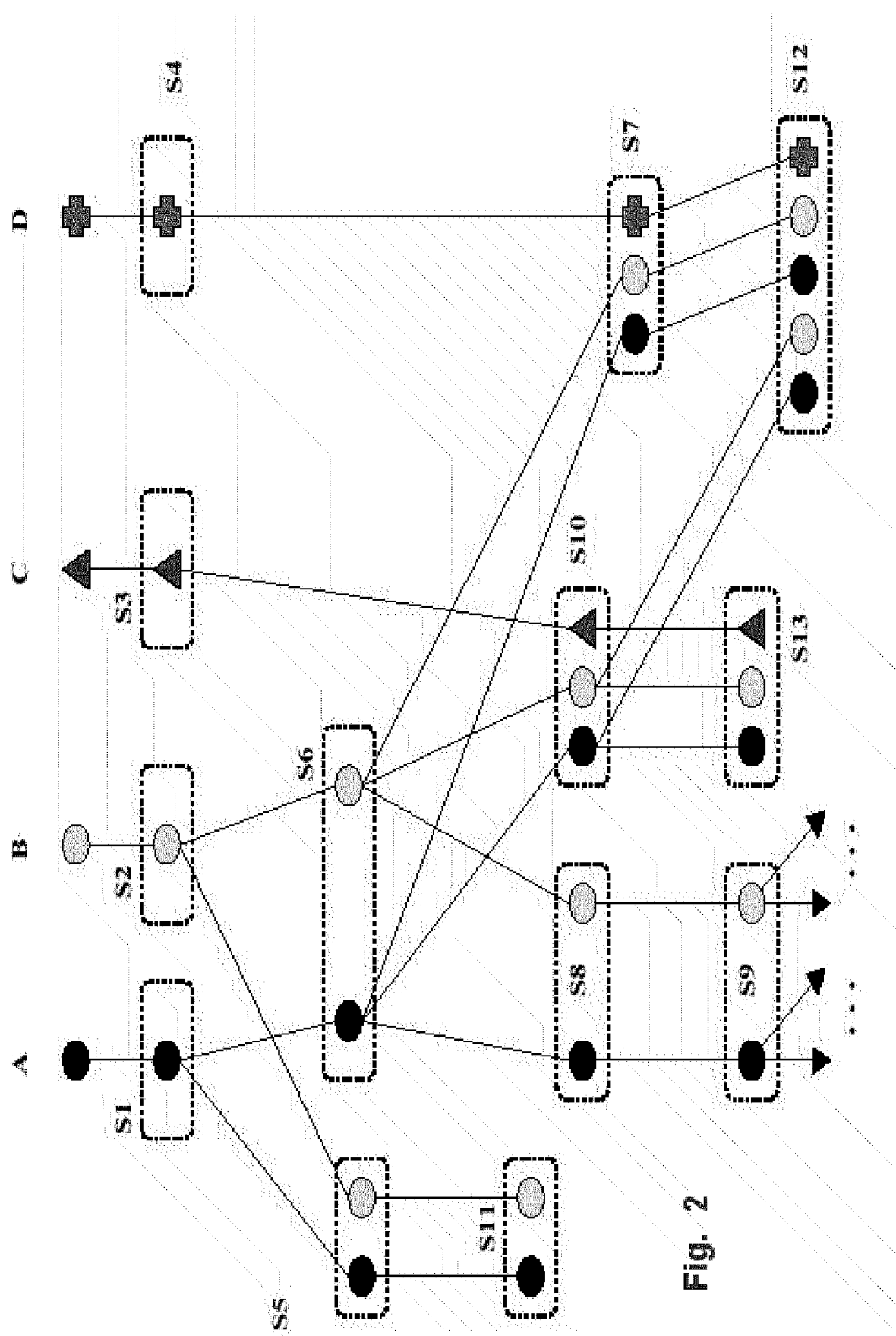
FIG. 2 shows an arbitrary nested client-server hierarchy in which increasing levels of abstraction and functionality can be introduced, providing a composite data management system.

As described above, in the system according to the invention, a light-weight architecture is provided, where each component is in itself its own advanced mini-transaction processing monitor. To accomplish this, the system is most readily implemented as a set of Java classes. The resulting architecture is as follows. In a composite system (such as that of FIG. 2), each server is an independent component performing its own scheduling and transaction management. These servers are built using Java and inheriting from the classes provided by the system according to the invention. The interface to each server defines the services it implements. An invocation of one of these services (through RMI or "remote method invocation") results in the creation of a local transaction (child of the invoking transaction and parent of any transaction that might be triggered by invoking the services of other servers). Each transaction is, for example, a thread that can invoke SQL statements in a local database (directly connected to that server) as well as services offered by other servers. All the information that is required to build a global composite transaction is implicitly added by the system to each call. Each transaction is, however, independently handled at each server. That is, the servers neither communicate among themselves nor rely on a centralized component to make scheduling or recovery decisions. In this way, components can be dynamically added or removed from the system without compromising correctness. All a new server needs to know is the interface and address of the servers it will invoke. Regardless of the configuration, the system according to the invention guarantees that transactions executed over these servers will be correct (serializable) and recoverable at a global and local level.

Scheduling and concurrency control> For notational purposes, t will denote a local transaction in a server. Each incoming RMI invocation triggers a location transaction: start (t) will be the start of the transaction, commit(t) the local commit, abort(t) the local abort, and globalCommit(T)/globalAbort(T) the notification to the server where t runs that T, the root transaction of t, has committed/aborted. Again for notational purposes root is the term used for the top-level transaction.

In each server, concurrency control and scheduling are based on call level locking. That is, checking for conflicts is done at the service level and not merely at the level of the operations used to implement those services. Internally, each server uses traditional 2PL (two-phase locking) to guarantee correctness using standard mechanisms but these resources (including connections and internal locks) are always released upon commitment of a local transaction. Call level locks are also acquired following a 2PL discipline but they are kept until the global transaction terminates or until the server unilaterally aborts the corresponding local transaction.

A call level lock is always acquired when a service is invoked. With each server, a conflict matrix needs to be supplied by the programmer. This matrix considers the effects of the forward operation and also of the compensation of an operation. An important characteristic is that, unlike in classical multilevel models, the conflict matrix for the system according to the invention needs to take only local into account; whatever is done by remote calls is handled at the remote server. This greatly simplifies the task of identifying conflicts. Informally, we say that two call level locks $l_1$ and $l_2$ obtained on behalf of two local transactions (service invocations) $t_1$ and $t_2$, conflict if $t_1$ conflicts with $t_2$ or $t_2$ conflicts with $u_1$, $u_1$ being the compensation of $t_1$. For simplicity, it is possible to use a symmetric conflict table but this can readily be changed if necessary. There is also the possibility of defining conflicts on item level granularity (that is, conflicts are only possible if both $t_1$, $t_2$ are on the same data item) or on service granularity (that is, it could be defined that invocations of $t_1$, $t_2$ always conflict regardless of what item is accessed).

Although this locking strategy provides correctness, the arbitrary configurations possible in a composite system require a more sophisticated treatment of call level locks. The key problem is that without any additional information, a server cannot distinguish between invocations that have nothing to do with each other and invocations that actually belong to the same root transaction (called siblings). In the former case the order of execution is not relevant. In the latter case, however, the order of execution is relevant. Not to be able to distinguish between these cases can quickly lead to inconsistencies and incorrect executions. Closed nested transactions avoid these situations by simply blocking all conflicting calls. In a composite system, if a server were to block invocations from siblings, a transaction could easily deadlock itself (which does happen in existing implementations of closed network transactions). Preventing such deadlocks would require having knowledge of the configuration, which contradicts the spirit of composite systems.

Importantly, in the system according to the invention, to avoid such problems, an additional rule is observed at each server: if $t_1$ and $t_2$ conflict but both are children of the same root transaction, they can both be executed provided that they are not executed in parallel. This implies, for example, that start($t_2$) must happen after commit($t_1$). With this rule, the scheduler can now block conflicting invocations from other transactions and allow conflicting invocations from the same transaction to proceed.

To recognize such parallelism, each root transaction (and each call it makes, whether directly or indirectly) is tagged with a flag that indicates if the root prefers serial execution or not. (Preferably this is a configuration parameter.) If yes, then well-behaved composite systems know automatically that there can be no parallel children of that root and therefore no blocking has to be enforced between such related transactions. This method allows the effective enforcement of lock inheritance without any additional communication between nodes.

Stated differently, the root transaction is able to dynamically set concurrency preferences for the resulting distributed transaction, based on client needs.

More can be said about an exemplary embodiment. In a general case, a transaction will comprise the local (or intra-process) invocation of any number of resources (such as files, faxes, and databases). Each such invocation leads to an internal participant instance for a globalCommit. Each such resource invocation as well as each remote service call also contains application-level detailed comments about the nature of the invocation. Such comments are explicitly made part of the globalCommit message exchanges. Such detailed comments are presented to a human administrator to aid in resolving heuristic global commitment problems. These comments are called heuristic messages. By making these messages an explicit part of the globalCommit protocol, any practical anomalies arising from node or communication failures are well documented with respect to their effects on the transaction.

It will be appreciated that this is why the heuristic messages are so important—a server could for instance access a local file (one Participant) and also access a local database as part of the same local transaction. These are still part of the same local transaction, but require an internal two-phase commit upon globalCommit of their invocation. During this activity, internal heuristic anomalies can occur. If the local file access fails then it is desired to have some comments about that specific operation, for instance what file it was and what should have been done to it.

In this way, it is possible to add "meta-information" to each interaction with a resource, be it a database SQL interaction or any other Participant.

It was mentioned above that if $t_1$ and $t_2$ conflict but both are children of the same root transaction, then it is desired to have a rule that they can both be executed provided that they are not executed in parallel. More generally, we would say that it is desired to ensure that the first transaction and the second transaction and any of their ancestors be kept from concurrent execution.

In this way we develop the ability to locally rule out concurrency at any level for children of a same invoking transaction. Stated differently, merely checking concurrency of invocations at the same server is not enough; there should be no other concurrent ancestors either. It may thus be said that the system does not simply rule out concurrency, rather it may be said that the system can check it (presence of concurrency constraints) without communication between sites.

Implementation of locking. Each incoming request to a server is mapped to a thread. In a Java implementation, since these are Remote Method Invocation invocations, this mapping-to-a-thread happens automatically. Setting the corresponding call level lock is done by the thread by creating an entry in a local lock table. If there is no conflicting lock, the thread proceeds to execute the code implementing the service. Otherwise, the thread returns with an exception (implying rollback of the local transaction). By immediately returning an exception, we force the client to be programmed in such as way so as to take into account that an invocation might not succeed on the first try. On the other hand, resources are more readily available and allow ongoing transactions to terminate sooner.

To facilitate the identification of siblings, the system automatically includes the root id (identifier) with each RMI call. For faster checking, the root id of a transaction is included in the lock table with the corresponding call level lock. Incoming requests are checked against the corresponding call level lock to see if they conflict and whether they are from the same root transaction.

Atomicity: recover and undo. At each server and for each service there is an undo operation provided by the designer of the service. Undo operations are local: only the local database updates are compensated. In case of abort of siblings, executing all undo transactions (or all conflicting undo transactions) for the same root in the reverse order of their respective executions guarantees that all changes are undone. Any remote calls will be handled by the undo transactions on the remote servers involved. If no undo operation is provided, the invocation of the service will be treated as a closed nested transaction: resources are not released until the termination of the global transaction.

To be informed about the fate of a transaction, we use the root id (as mentioned above, this is automatically propagated with the RMI call). If the local transaction is still being executed and needs to be aborted, it is undone using traditional mechanisms. If the local transaction needs to be aborted after having been committed, the undo operation is used. The call level lock guarantees that the undo operation can be applied. If the root transaction commits, then an optimized form of 2 Phase Commit is used to commit all sub-transactions throughout the system (releasing the call level locks). Note that for early committed subtransactions, this termination protocol simply involves releasing call-level locks, writing a log entry and cascading the decision to any remaining servers.

Again, it should be appreciate that a local invocation (hence transaction) may have more than one undo associated with it—one for each resource type it invokes. The appropriate undoes are executed on each resource, in reversed order (as determined by each resource).

Implementation of Atomicity. A global transaction is committed using a cascaded variant of 2PC (two-phase commit): each server assumes the role of coordinator for all servers it invokes. To speed up the process, different servers are contacted in parallel: each communication round in the two-phase commit protocol is implemented by one separate thread per server involved. The two-phase commit protocol uses the root identifier as the label to indicate to each server which subtransactions are to be committed. Just like all other communications in the system according to the invention, 2PC happens through RMI. This solves problems with firewalls, because RMI calls can automatically be tunneled through http (hypertext transfer protocol). A negative acknowledgment (a "NO" vote) is implemented as a RemoteException being thrown.

In addition, and also for reasons of efficiency, it is not always feasible to wait until the root decides to abort or commit. For instance, servers could be disconnected from the rest of the system or network partitions (losses of connectivity) could occur. In those cases, and given that the system is built upon independent components, each server has the right to undo local transactions on its own—as long as it has not heard from any global outcome. After the undo, all local locks and the call level lock can be released. The "right" to undo a local transaction has to be constrained, otherwise a server could undo its local transaction during the interval during which the global commit message is traveling through the system. Thus, when a server receives a "prepare" message and agrees to it, it loses the right to perform a server-side undo.

This approach is complicated by the fact that RMI does not provide "exactly once" semantics. More precisely, the failure of a remote call does not necessarily mean that it has not been executed. It could have been executed, leaving behind a locally committed transaction ($t_1$) and the corresponding call level locks set. The invoker, however, sees the call fail and may think that the transaction has actually aborted. In that case, the server will eventually time out and undo the transaction locally, releasing the call level locks. This might result in incorrect executions if—on that server—later (successful) calls exist for the same root transaction. Let $t_2$ denote one such sibling subtransaction executed right after $t_1$. Locally undoing $t_1$ with $u_1$ will only be correct if the sequence $t_1 t_2 u_1$ is equivalent to the sequence $t_1 u_1 t_2$ or $t_2 t_1 u_1$. To avoid these and similar problems, the system according to the invention proceeds as will now be described. When a server propagates a globalCommit operation, it adds to the message the number of invocations it has made to a given server on behalf of the root transaction to be committed. The server that receives the globalCommit checks this figure against its own. If they match, then the commit protocol proceeds. Otherwise, the transaction will be aborted. Since in the latter case there are discrepancies about what has been done at each node, aborting is the safest option. In this context, any references to globalCommit will implicitly include possible extra messages such as, for instance, a prepare message.

To keep track of all the information needed to perform these operations, the system according to the invention relies on logging. Each server keeps a log-table inside the local database. As soon as a transaction commits locally, the log-table reflects the fact that the transaction made local changes (which information would be needed after recovery). The log-table contains the transaction identifiers of those transactions that committed locally. This way, recovery requires from the database no more or different information than required by prevalent interfaces such as XA.

A file-based log is used to keep track of the two-phase commit status of a transaction after it has been committed locally. On recovery, the system can determine the right action by inspecting the log-table in the database and comparing this with the external log file information. For instance, upon restart, a transaction may appear in the database log file but not in the external log file. This is a transaction that committed locally but without a global outcome. This transaction will be compensated as part of the restart procedure, thereby ensuring consistency.

Dealing with undo operations. As mentioned above, it is assumed that the designer of a service will provide an associated undo operation. By definition, in the system according to the invention the programmer only needs to worry about the data integrity of the local server. This means that writing the software to perform the undo operation is relatively straightforward. On the other hand, if no undo operation is provided by the designer of a service, then the system will simply retain resources until the root commits, as is done in prior-art systems. An advantage of the system according to the invention is that knowledgeable users can exploit open-nested transactions to increase significantly the degree of parallelism.

From the concurrency control point of view, executing an undo poses no problem because there is a lock on the corresponding service. If an undo operation needs to be executed, it will always be serialized immediately after the operation it is supposed to undo. Depending on the underlying database system, however, writing an undo operation may be quite complex. Typical problems involve dealing with constraints and triggers. In general, as long as there are no side effects (such as triggers or constraints that the system—or its programmer—does not know about), then the system according to the invention can handle these cases just like any existing system handles them. That is, the system can simply block concurrent updates to the same items, which is called strict 2PL behavior.

Experience with the system according to the invention suggests that the level of knowledge necessary to write an undo operation can be compared with what a typical database designer has to know about isolation levels to ensure data consistency in the local database.

Optimizing logging and locking. It will be appreciated that for the undo operation to work, it is necessary to store whatever information would be needed for the undo operation. In the system according to the invention, the information needed for the undo operation is pushed onto a stack object. Database programmers know the kinds of information that needs to be stored, which may be the values of certain variables, the tables used for the undo, transaction id's, and so on. When the transaction commits, this stack object is written into a file log. In case an abort occurs, the system restores the transaction's undo stack. The undo operation can then read this object and proceed.

Experience with the system according to the invention permits optimizing this storage. For example, it might be thought that storage could be done by inserting a record into a table and later discarding by deleting a record from the table. Such an approach turns out to yield poor performance. It turns out to be preferable to use a pool of log entries in a fixed-size table (the size of the table being a parameter which can be changed as needed). This table is indexed by means of a numeric index entry. The server component maintains in RAM a list of available entries in the logging table, and allocates each entry to a transaction when needed. Storing un log is done by updating the log table, rather than inserting into it. This approach contributes to good system performance.

Figure 6:
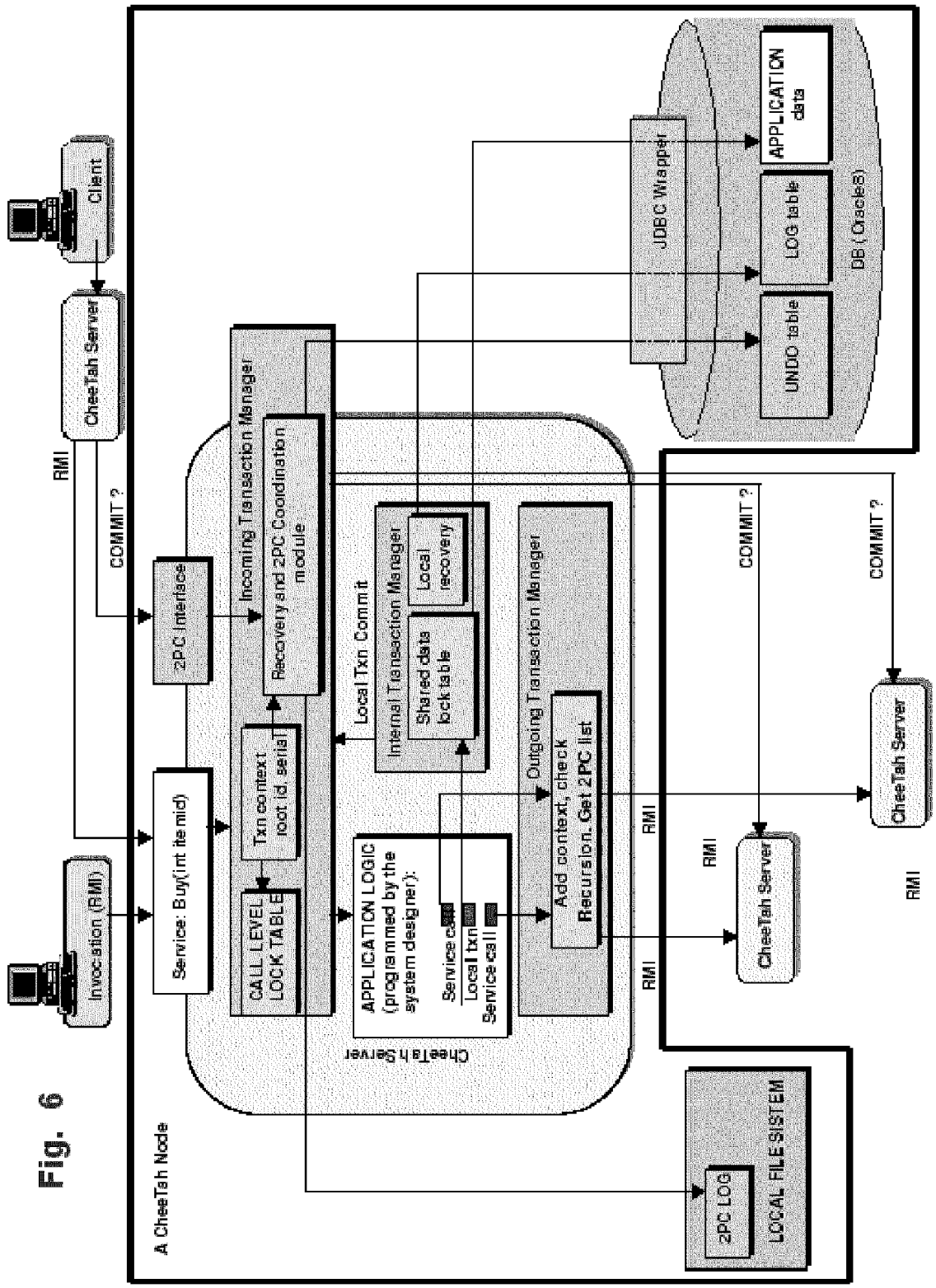
FIG. 6 shows in functional block diagram form a typical server according to the invention.

A server according to the invention. FIG. 6 shows a server according to the invention. The detailed structure is, of course, chosen according to the particular application. In this case the server simulates a purchase point where a number of different items can be bought.

The interface to the service is a method called Buy takes as an argument the id of the item to be bought, called itemid. The method is implemented as a Java program that makes calls to a local database and invokes the services of other servers (through RMI calls). This is the code that needs to be implemented by the designer. The lock table provided indicates that two invocations to the Buy conflict if they have the same itemid (that is, they are buying the same thing). Each server uses a local database (in this example, Oracle8) for storing its own data (log tables) and also to act as the local application database. Preferably the access to the database takes place through a Java Database Connectivity (JDBC) interface using connection pooling.

The server also uses the local file system to store additional information such as the global log used to track the progress of 2PC. Each server has conceptually (internally, they are deeply intertwined) three transaction managers (incoming TM, internal TM, and outgoing TM). The incoming TM takes care of the incoming RMI calls and uses the call level lock table to determine what to do (whether to proceed or to return an exception). It also produces the entries stored in the file system log (related to 2PC). Context information, root id for the transaction, overall status and any additional information related to the composite transaction is stored in main memory and managed by the incoming TM. Messages about termination of global transactions are rerouted to the incoming TM where they are processed as explained above. The internal TM takes care of internal consistency (access to shared variables and internal data as well as access to the local database). It produces the entries in the database log table and it is in change of rolling back active transactions if they are aborted. Once a transaction commits locally, the internal TM discards all the information related to the transaction. The outgoing TM is quite limited in that it only adds the root transaction data to each remote call.

Dealing with two-phase commit anomalies: alleviating the blocking problem. As mentioned above, it is a well-known fact that distributed agreement (of which two-phase commit is an example) can always lead to blocking if both node failures and communication failures are possible. In those cases, parts of a distributed system are left in an indecisive (in-doubt) state. For data sources, this implies that locks have to be kept indefinitely, leading to serious availability problems. The system of the invention offer various ways to alleviate this problem: Firstly, through the use of high-level semantics it is possible to allow less restrictive locking. Also, the fact that local invocations are committed early (and undone by a compensating transaction on rollback) allows low-level resources to be reused early. Lastly, the system according to the invention consistently enforces so-called heuristic decisions: after some timeout, an in-doubt participant will either rollback or will commit on its own. The timeout, as well as whether to commit or rollback can be specified by the system administrator. This allows the release of resources in this participant, but at the expense of having to perform reconciliation if the eventual outcome of the global transaction is different from the decision made by the participant. To facilitate this task (which has to be performed by a human administrator) the system according to the invention offers a unique feature of high-level comments (so-called 'heuristic messages') that can be added to a transaction by the application logic.

For heuristically terminated transactions, the administrator will see an overview of all these heuristic messages. This allows detailed tracking of what went wrong, and gives hints to how to solve the problem.

Dealing with any kind of resource: the Participant interface. So-called Participant and RecoverableResource interfaces (see exemplary program listing below) allow the system to make virtually ANY object or resource transactional. The Participant interface is an enhanced version of the CORBA OTS Resource interface. The enhancements with respect to OTS cover information for the detection of orphans (essential for distributed atomicity) and heuristic information for heuristically terminated tasks.

The RecoverableResource interface is an enhancement of the XA interfaces, which are too low to be useful in practice. The use of this interface is for recovery: the transaction manager can sometimes only keep part of the context of a Participant (for instance, the internal state of a database system cannot be stored in the logs of an external transaction manager). Therefore, the transaction manager should be able to ask a resource for help during recovery (by calling the recovery method). As soon as the transaction manager has finished recovery, it notifies the RecoverableResource (by calling endRecovery) that any remaining (non-recovered) context belongs to an aborted transaction and can therefore be discarded.

The kind of accesses are limited only by the Participant interface—anything that can act as one of these can also be used by a server. So if it wants, a server can have multiple resource interaction types (each leading to specific Participant implementations), and access different resources as part of one invocation (but these resources are "embedded" in each server process, so it is not centralized).

Internally, these interactions are the interactions that currently have an undo specified. Hence, a local invocation (hence transaction) may have more than one undo associated with it—one for each resource type it invokes. The appropriate undoes are executed on each resource, in reversed order (as determined by each resource).

If the local file access fails then it is desired to provide some comments about that specific operation, for instance what file it was and what should have been done to it. This way, it is possible to add "meta-information" to each interaction with a resource, be it a database SQL interaction or any other Participant.

Figure 3:
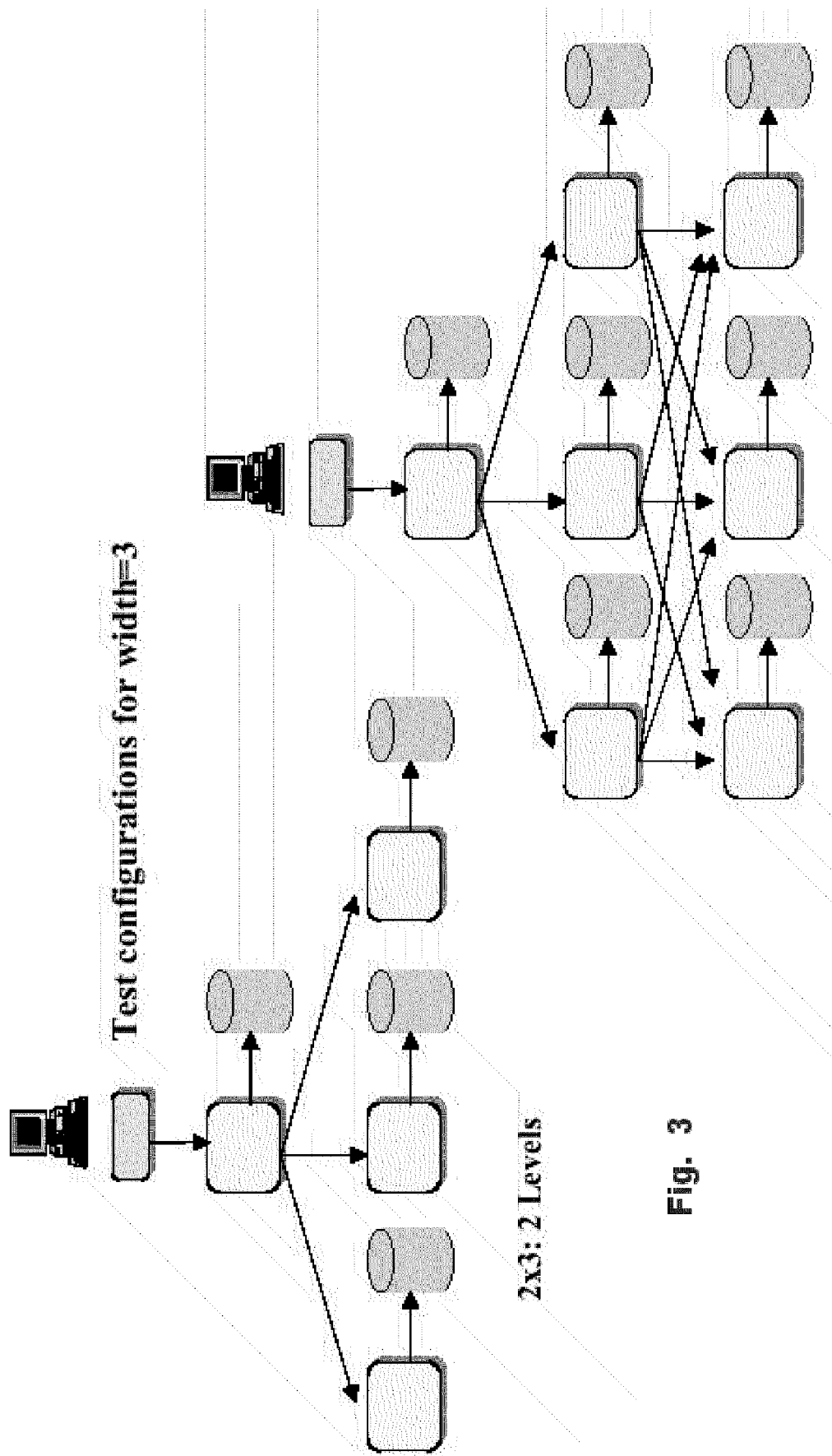
FIG. 3 shows two different test configurations which might be used for testing of system performance. These configurations assume a "width" of 3, that being the number of resources that potentially could be invoked in parallel. The right part of FIG. 3 shows a more complex test in which resources on a given process may be children of differing parent processes.
Figure 4:
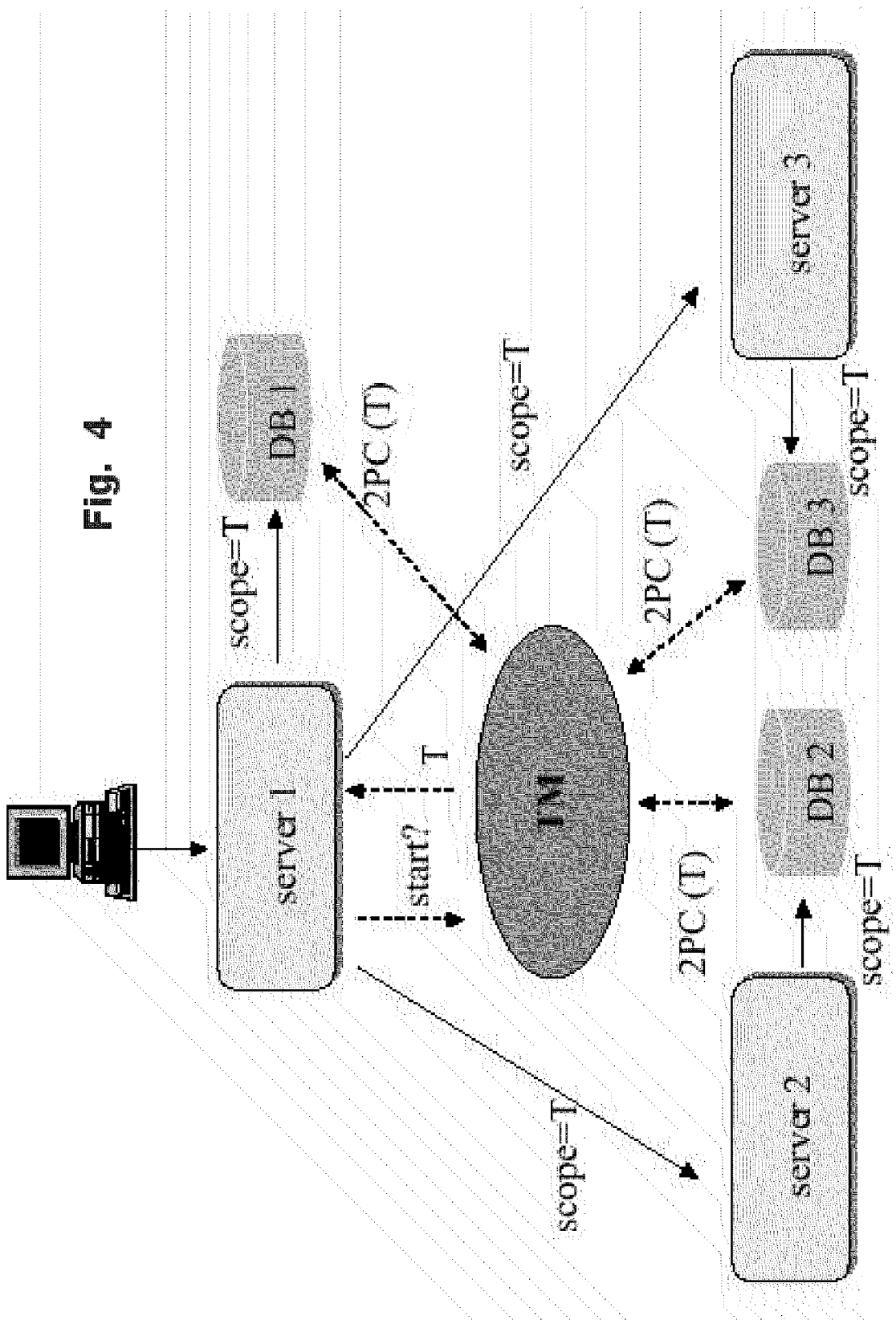
FIG. 4 shows in functional block diagram form a system in which a single transaction monitor mediates changes to three different databases, according to the prior art.
Figure 5:
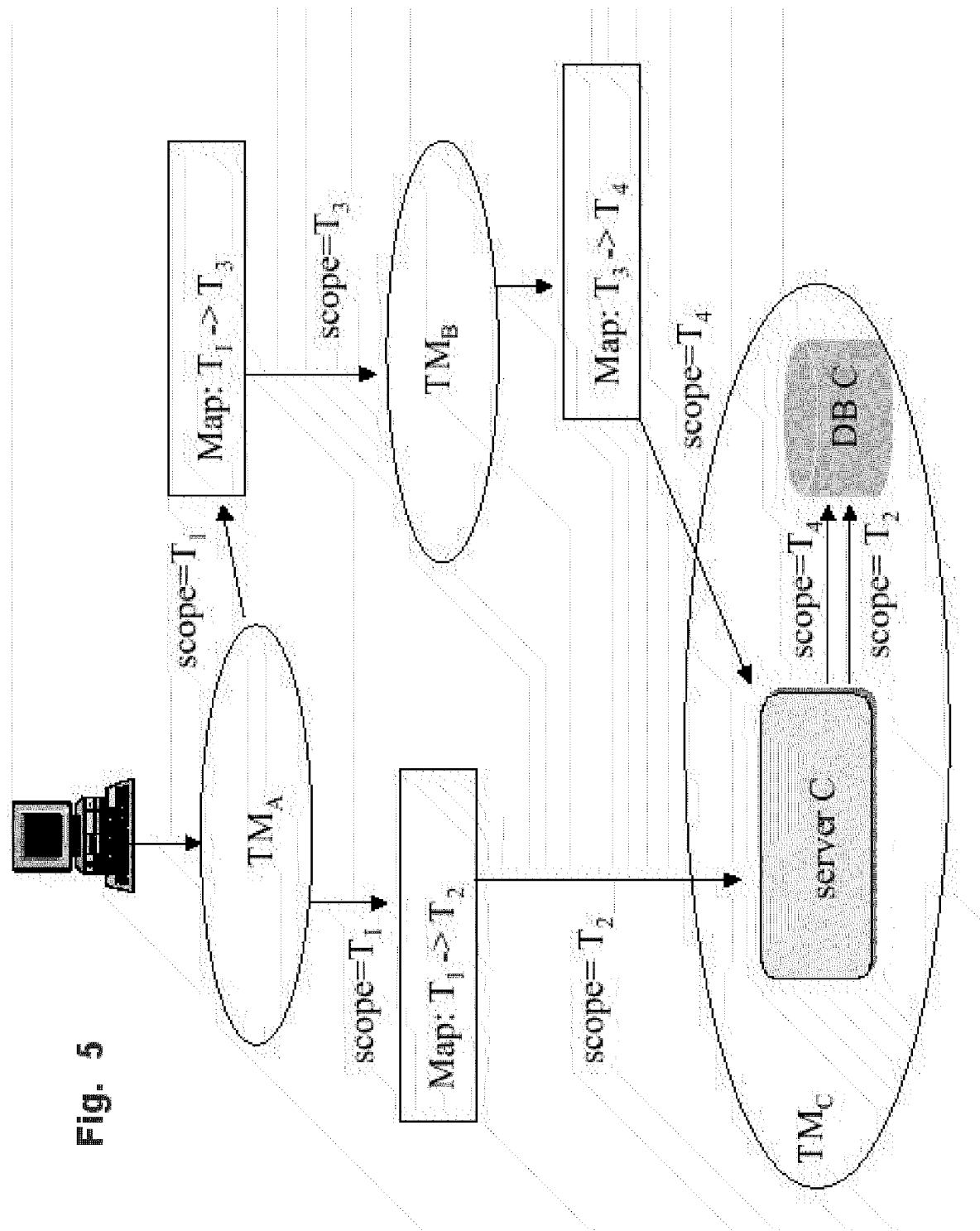
FIG. 5 shows in functional block diagram form a system in which multiple information systems interact transactionally, entailing that more than one transaction monitor must be involved.

System performance. FIG. 3 shows two different test configurations which might be used for testing of system performance. These configurations assume a "width" of 3, that being the number of resources that potentially could be invoked in parallel. The right part of FIG. 3 shows a more complex test in which resources on a given process may be children of differing parent processes. Actual simulations have shown the system of the invention to have performance comparable to that of prior-art systems, and yet without the single-point-of-failure problems in some prior art systems.

Those skilled in the art will have no difficulty devising myriad obvious variations and improvements which in no way deviate from the invention itself, all of which are intended to be encompassed by the claims which follow.

Program Listing

```
package com.atomikos.icatch; import java.util.*; import
com.atomikos.finitestates.*; import com.atomikos.util.*;
import com.atomikos.diagnostics.*;/** *Copyright (C)
2001, Guy Pardon. All rights reserved.
 * *A composite transaction is a nested part of a global
*composite transaction. Each invocation of a server is *rep-
resented by an instance of this type.
 * */public interface CompositeTransaction extends State-
ful{/** *Test if this instance is a root or not.
   *Note: a root is the top-level transaction; that is: the first
transaction *that was created in the distributed transaction
hierarchy.
 * *@return True if this is the root.
*/ public boolean isRoot( ); /** *Get the ancestor info.
*@return Stack A stack of ancestor identifiers, topmost is
root.
*/ public Stack getLineage( ); /** *Getter for tid.
 * *@return UniqueId The tid for the tx.
*/ public UniqueId getTid( ); /** *Test if this instance is an
ancestor of ct.
 * *@param ct The argument to test for ancestor.
 * *@return boolean True iff this is an ancestor of ct.
*/ public boolean isAncestorOf(CompositeTransaction
ct); /** *Test if this instance is a descendant of ct.
 * *@param ct The argument to test for descendant.
 * *@return boolean True iff this instance is a descendant of
ct.
*/ public boolean isDescendantOf(CompositeTransaction
ct); /** *Test if this instance is related to ct.
 *@return True if related. That is: if both share the same
root transaction.
*/ public boolean isRelatedTransaction (CompositeTrans-
action ct); /** *Test if this intance represents the same trans-
action as ct.
 *@return True iff the same.
*/ public boolean isSameTransaction (CompositeTransac-
tion ct); /** *Get the coordinator for this tx.
 * *@return CompositeCoordinator The composite coordi-
nator instance.
 *@exception UnavailableException If the calling thread
has no privileges.
 *@exception SysException On failure.
*/ public CompositeCoordinator getCompositeCoordina-
tor( ) throws UnavailableException, SysException; /** *Add
a new participant.
 * *@param participant The participant to add.
 *@return RecoveryCoordinator Whom to ask for indoubt
timeout resolution.
 *@exception SysException Unexpected.
 *@exception IllegalStateException Illegal state.
 *@exception RollbackException If tx was marked for roll-
back.
*/ public RecoveryCoordinator addParticipant (Participant
participant) throws SysException, java.lang.IllegalStateEx-
ception, RollbackException; /** *Add a synchronization
callback.
 * *@param sync The callback object.
 *@exception RollbackException If rollback set.
 *@exception IllegalStateException If no tx longer active.
 *@exception UnavailableException If this operation is not
supported.
 *(This might happen if the instance is not a local instance).
 *@exception SysException Unexpected failure.
*/ public void registerSynchronization(Synchronization
sync) throws RollbackException, IllegalStateException,
UnavailableException, SysException; /** *Register a par-
ticipant on behalf of a subtransaction, to be *notified as soon
as the locally finished state is reached.
 *Resources that support lock inheritance can use this fea-
ture *to be notified whenever a lock should be inherited.
 * *@param subtxaware The participant to be notified *on
local termination.
 * *@exception IllegalStateException If no longer active.
 *@exception UnavailableException If this operation is not
supported.
*/ public void addSubTxAwareParticipant(SubTx-
AwareParticipant subtxaware) throws SysException,
UnavailableException, java.lang.IllegalStateException; /**
*Test if serial tx or not.
 *Serial mode is an optimized way for lock inheritance: *no
locks among related transactions are necessary if all related
*transactions are executed serially with respect to each other.
 *The serial property is set by the root transaction and is
*propagated to all its subtransactions.
 * *@return boolean True iff all for root is serial.
*/ public boolean isSerial( ); /** *Get a control object for
this tx.
 * *@return TransactionControl a control object.
 *@exception UnavailableException If the calling thread
has no *privileges.
*/ public TransactionControl getTransactionControl( )
throws UnavailableException; /** *Sets the tag for this trans-
action. This is returned as a summary of *the local work in
case the transaction was imported from a remote *client TM.
 * *@param tag The tag to add to the transaction.
*/ public void setTag (HeuristicMessage tag); /** *Test if
the transaction is a locally started transaction or not.
 * *@return boolean True iff started in the local VM.
 *For imported transactions, this is false.
*/ public boolean isLocal ( ); }//$Id$//$Log$package
com.atomikos.datasource; import java.util.Vector; import
com.atomikos.icatch.*; import com.atomikos.persistence.*;
import com.atomikos.diagnostics.*; /** *Copyright ©
2001, Guy Pardon. All rights reserved.
 * *A Recoverable Resource is the abstraction of a resource
*that supports recoverable work (i.e., that supports Partici-
pant *instances). Its primary use is for Participant instances
that are *not self-containing, as for instance in XA transac-
tions *(where the Participant can not contain the entire trans-
action *context of the server, but only an external reference to
it in the *form of an Xid instance).
 *A recoverable resource is invoked at recovery time by its
*own Participant instances (typically in the readExternal
*method), who iteratively ask each resource *in the
com.atomikos.icatch. Configuration whether or not they *can
be recovered by them. At the end of recovery, *the TM will
invoke the endRecovery method, to indicate to the *resource
that whatever private logs it has, any remaining *and non-
recovered participants should be aborted.
*/ public interface RecoverableResource{/** *Recover the
partially reconstructed Participant.
 *@param participant A partially recovered Participant.
 *@exception ResourceException On failure.
 *@return boolean True iff reconstruction was successful.
 *If the resource is not responsible for the given participant,
*then this will return false.
 *A Participant can use this to iterate over all resources in
order *to eventually recover itself. This is particularly *useful
if the Participant instance can not serialize *its full state,
because some of it is on its backside *resource (as, for
instance, in XA).
 *This way, the TransactionalResource can be used to
*assist in reconstruction of the Participant's state.
```

*/ public boolean recover (Participant participant) throws ResourceException; /** *Notify the resource that recovery is ended.

*Called by TM at end of recovery; any remaining *resourcetransactions (i.e., that have not been *associated with any recover call) should be rolled back.

*This is because if the were not recovered by the TM, *then surely they are not supposed to be indoubt *(the TM recovers ALL indoubt work!) and should be *rolled back.

* *@exception ResourceException On failure.

*/ public void endRecovery ( ) throws ResourceException; /** *Get the name of the resource. Names should be unique *within one TM domain.

*@return String The name.

*/ public String getName( ); /** *Test if a resource is the same as another one.

*/ public boolean isSameRM(RecoverableResource res) throws ResourceException; }//$Id: Participant.java,v 1.1.1.1 2001/10/09 12:37:25 guy Exp $//$Log: Participant.java,v $//Revision 1.1.1.1 2001/10/09 12:37:25 guy//Core module////Revision 1.11 2001/03/23 17:00:30 pardon//Lots of implementations for Terminator and proxies.

package com.atomikos.icatch; import com.atomikos.diagnostics.*; import com.atomikos.finitestates.*; /** *Copyright (C) 2001, Guy Pardon. All rights reserved.

* *A participant for 2PC of composite transactions.

*By implementing this interface, ANY resource can be added *as a 2PC participant in the icatch kernel.

*Thus, you can extent the functionality of your transaction system! * *VERY IMPORTANT: implementations should also override the *default <code>equals</code> *and <code>hashCode</code> methods, in order for 2PC to work! * */public interface Participant extends java.io.Serializable{/ ** *Indicates that no commit/rollback needed after prepare.

*/ public static final int READ_ONLY=0x00; /** *For cascading 2PC, this method sets the information needed *to cascade. <b> This method is relevant only for *transaction monitors; if you are implementing a *new type of resource, then you can leave this *method empty!</b> * *@param allParticipants The information needed by *the transaction monitor for * *@exception SysException For unexpected failures.

*/ public void setCascadeList(Java.util.Dictionary allParticipants) throws SysException; /** *Set by the root coordinator: the total no of siblings detected.

*<b> This method is relevant only for *transaction monitors; if you are implementing a *new type of resource, then you can leave this *method empty!</b> * *@param count The global count.

*/ public void setGlobalSiblingCount(int count); /** *Prepare the participant.

*Any locks for this participant's work should be *recoverable (either saved to an external file OR be part *of the instance's non-transient state so that they can be *flushed into the transaction manager's log).

* *@return int If this is READ_ONLY, then no second round is needed.

*Participants that return this value on prepare will not be *called by commit or rollback afterwards.

*@exception RollbackException For a NO vote.

*This indicates that the participant has already rolled back *(or marked for rollback) the work on behalf of this participant.

*@exception HeurHazardException On possible conflicts.

*This happens for remote participants instances, in case of *communication failures. If you are adding participants *that are local in the server's VM (recommended!) then you *probably never need to throw this.

*@exception SysException Unexpected errors.

*/ public int prepare( ) throws RollbackException, HeurHazardException, SysException; /** *Commit the participant's work.

*NOTE: custom participant implementations should *preferably be made for the server's local VM *(e.g., it is better not to do this over RMI).

*Also, they should <b>rely on the icatch transaction manager *for heuristic timeout</b> (and NOT decide to terminate *heuristically <b>themselves</b>).

*In that case, you never need to throw any of the heuristic exceptions *of this method.

* * *@return HeuristicMessage[ ] An array of messages, null if none.

* *@param onePhase If true, one-phase commit is being started.

*If the participant has received a prepare call earlier, *then it should throw a SysException here.

* *@exception HeuristicRollbackException If the participant has rolled back.

* *@exception HeuristicMixedException If part of it was rolled back.

*@exception HeurHazardException On possible conflicts.

*@exception RollbackException In case of one-phase commit, *and the transaction has been rolled back at the time *commit is called.

*@exception SysException Unexpected failure.

*/ public HeuristicMessage[ ] commit (boolean onePhase) throws HeurRollbackException, HeurHazardException, HeurMixedException, RollbackException, SysException; /** *Rollback the participant's work.

* *NOTE: custom participant implementations should *preferably be made for the server's local VM *(e.g., it is better not to do this over RMI).

*Also, they should <b>rely on the icatch transaction manager *for heuristic timeout</b> (and NOT decide to terminate *heuristically <b>themselves</b>).

*In that case, you never need to throw any of the heuristic exceptions *of this method.

* *@return HeuristicMessage[ ] An array of messages, null if none.

* *@exception HeurCommitException If the participant committed.

*@exception HeurHazardException If the participant's final state *is unsure.

*@exception HeurMixedException If part of it was rolled back.

*@exception SysException Unexpected failure.

*/ public HeuristicMessage[ ] rollback( ) throws HeurCommitException, HeurMixedException, HeurHazardException, SysException; /** *Indicate that a heuristic participant can forget about its work.

* *If you rely on the transaction manager to *decide when to do heuristics (rather then deciding *in the participant implementation), then you can *leave this method empty.

*/ public void forget( ); /** *Get any heuristic messages so far.

*The transaction manager used this method to *get information after preparing this participant.

* *@return HeuristicMessage[ ] An array of heuristic messages, or null if none.

*/ public HeuristicMessage[ ] getHeuristicMessages( ); }//$Id: Extent.java,v 1.1.1.1 2001/10/09 12:37:

25 guy Exp $//$Log: Extent.java,v $//Revision 1.1.1.1 2001/ 10/09 12:37:25 guy//Core module////Revision 1.1 2001/03/ 23 17:01:59 pardon//Added some files to repository.
//package com.atomikos.icatch; import java.util.*; /** *Copyright (C) 2001, Guy Pardon. All rights reserved.
* *The extent carries the information about the 'size' of a propagation *after it returns: the indirectly invoked servers, and the orphan detection *information for those.
*/public interface Extent extends java.io.Serializable{/** *Get the remote participants indirectly invoked.
* *@return Dictionary Mapping participants to Integer counts.
*/ public Dictionary getRemoteParticipants( ); /** *Add another extent to the current extent.
* *@param extent The extent to add.
*@exception IllegalStateException If no longer allowed.
*@exception SysException Unexpected error.
*/ public void add (Extent extent) throws IllegalStateException, SysException; /** *Add a participant to the extent.
* *@param participant The participant to add.
*@param count The number of invocations detected by the adding client.
*@exception IllegalStateException If no longer allowed.
*@exception SysException Unexpected error.
*/ public void add (Participant participant, int count) throws IllegalStateException, SysException; /** *Get the participant to add at the client TM.
*By calling this method, the client TM can get a handle *to include in its coordinator 2PC set for the *composite transaction.
*/ public Participant getParticipant( ) throws SysException; }
Program Listing Deposit
package com.atomikos.icatch; import java.util.*; import com.atomikos.finitestates.*; import com.atomikos.util.*; import com.atomikos.diagnostics.*; /** *Copyright (C) 2001, Guy Pardon. All rights reserved. * *A composite transaction is a nested part of a global *composite transaction. Each invocation of a server is *represented by an instance of this type. * */public interface CompositeTransaction extends Stateful{/** *Test if this instance is a root or not. *Note: a root is the top-level transaction; that is: the first transaction *that was created in the distributed transaction hierarchy. * *@return True if this is the root. */ public boolean isRoot( ); /** *Get the ancestor info. *@return Stack A stack of ancestor identifiers, topmost is root. */ public Stack getLineage( ); /** *Getter for tid. * *@return UniqueId The tid for the tx. */ public UniqueId getTid( ); /** *Test if this instance is an ancestor of ct. * *@param ct The argument to test for ancestor. * *@return boolean True iff this is an ancestor of ct. */ public boolean isAncestorOf(CompositeTransaction ct); /** *Test if this instance is a descendant of ct. * *@param ct The argument to test for descendant. * *@return boolean True iff this instance is a descendant of ct. */ public boolean isDescendantOf(CompositeTransaction ct); /** *Test if this instance is related to ct. *@return True if related. That is: if both share the same root transaction. */ public boolean isRelatedTransaction (CompositeTransaction ct); /** *Test if this intance represents the same transaction as ct. *@return True iff the same. */ public boolean isSameTransaction (CompositeTransaction ct); /** *Get the coordinator for this tx. * *@return CompositeCoordinator The composite coordinator instance. *@exception UnavailableException If the calling thread has no privileges. *@exception SysException On failure. */ public CompositeCoordinator getCompositeCoordinator( ) throws UnavailableException, SysException; /** *Add a new participant. * *@param participant The partici- pant to add. *@return RecoveryCoordinator Whom to ask for indoubt timeout resolution. *@exception SysException Unexpected. *@exception IllegalStateException Illegal state. *@exception RollbackException If tx was marked for rollback. */ public RecoveryCoordinator addParticipant (Participant participant) throws SysException, java.lang.IllegalStateException, RollbackException; /** *Add a synchronization callback. * *@param sync The callback object. *@exception RollbackException If rollback set. *@exception IllegalStateException If no tx longer active. *@exception UnavailableException If this operation is not supported. *(This might happen if the instance is not a local instance). *@exception SysException Unexpected failure. */ public void registerSynchronization(Synchronization sync) throws RollbackException, IllegalStateException, UnavailableException, SysException; /** *Register a participant on behalf of a subtransaction, to be *notified as soon as the locally finished state is reached. *Resources that support lock inheritance can use this feature *to be notified whenever a lock should be inherited. * *@param subtxaware The participant to be notified *on local termination. * *@exception IllegalStateException If no longer active. *@exception UnavailableException If this operation is not supported. */public void addSubTxAwareParticipant(SubTxAwareParticipant subtxaware) throws SysException, UnavailableException, java.lang.IllegalStateException; /** *Test if serial tx or not. *Serial mode is an optimized way for lock inheritance: *no locks among related transactions are necessary if all related *transactions are executed serially with respect to each other. *The serial property is set by the root transaction and is *propagated to all its subtransactions. * *@return boolean True iff all for root is serial. */public boolean isSerial( ); /** *Get a control object for this tx. * *@return TransactionControl a control object. *@exception UnavailableException If the calling thread has no *privileges. */ public TransactionControl getTransactionControl( ) throws UnavailableException; /** *Sets the tag for this transaction. This is returned as a summary of *the local work in case the transaction was imported from a remote *client TM. * *@param tag The tag to add to the transaction. */ public void setTag (HeuristicMessage tag); /** *Test if the transaction is a locally started transaction or not. * *@return boolean True iff started in the local VM. *For imported transactions, this is false. */ public boolean isLocal ( ); }//$Id$//$Log$package com.atomikos.datasource; import java.util.Vector; import com.atomikos.icatch.*; import com.atomikos.persistence.*; import com.atomikos.diagnostics.*; /** *Copyright © 2001, Guy Pardon. All rights reserved. * *A Recoverable Resource is the abstraction of a resource *that supports recoverable work (i.e., that supports Participant *instances). Its primary use is for Participant instances that are *not self-containing, as for instance in XA transactions *(where the Participant can not contain the entire transaction *context of the server, but only an external reference to it in the *form of an Xid instance). *A recoverable resource is invoked at recovery time by its *own Participant instances (typically in the readExternal *method), who iteratively ask each resource *in the com.atomikos.icatch. Configuration whether or not they *can be recovered by them. At the end of recovery, *the TM will invoke the endRecovery method, to indicate to the *resource that whatever private logs it has, any remaining *and non-recovered participants should be aborted. */ public interface RecoverableResource{/** *Recover the partially reconstructed Participant. *@param participant A partially recovered Participant. *@exception ResourceException On failure. *@return boolean True iff reconstruction was successful. *If the resource is not responsible for the given participant, *then this will return false. *A Participant can use this to iterate over all resources in order *to eventually recover itself. This is particularly *useful if the Participant instance can not serialize *its full state, because some of it is on its backside *resource (as, for instance, in XA). *This way, the TransactionalResource can be used to *assist in reconstruction of the Participant's state. */ public boolean recover (Participant participant) throws ResourceException; /** *Notify the resource that recovery is ended. *Called by TM at end of recovery; any remaining *resourcetransactions (i.e., that have not been *associated with any recover call) should be rolled back. *This is because if the were not recovered by the TM, *then surely they are not supposed to be indoubt *(the TM recovers ALL indoubt work!) and should be *rolled back. * *@exception ResourceException On failure. */ public void endRecovery ( ) throws ResourceException; /** *Get the name of the resource. Names should be unique *within one TM domain. *@return String The name. */ public String getName( ); /** *Test if a resource is the same as another one. */ public boolean isSameRM(RecoverableResource res) throws ResourceException; }//$Id: Participant.java,v 1.1.1.1 2001/10/09 12:37:25 guy Exp $//$Log: Participant.java,v $//Revision 1.1.1.1 2001/10/09 12:37:25 guy//Core module-////Revision 1.11 2001/03/23 17:00:30 pardon//Lots of implementations for Terminator and proxies.package com.atomikos.icatch; import com.atomikos.diagnostics.*; import com.atomikos.finitestates.*; /** *Copyright (C) 2001, Guy Pardon. All rights reserved. * *A participant for 2PC of composite transactions. *By implementing this interface, ANY resource can be added *as a 2PC participant in the icatch kernel. *Thus, you can extent the functionality of your transaction system! * *VERY IMPORTANT: implementations should also override the *default <code>equals</code> *and <code>hashCode</code> methods, in order for 2PC to work! * */public interface Participant extends java.io.Serializable{/** *Indicates that no commit/rollback needed after prepare. */ public static final int READ_ONLY=0x00; /** *For cascading 2PC, this method sets the information needed *to cascade. <b> This method is relevant only for *transaction monitors; if you are implementing a *new type of resource, then you can leave this *method empty!</b> * *@param allParticipants The information needed by *the transaction monitor for * *@exception SysException For unexpected failures. */ public void setCascadeList(Java.util.Dictionary allParticipants) throws SysException; /** *Set by the root coordinator: the total no of siblings detected. *<b> This method is relevant only for *transaction monitors; if you are implementing a *new type of resource, then you can leave this *method empty!</b> * *@param count The global count. */ public void setGlobalSiblingCount (int count); /** *Prepare the participant. *Any locks for this participant's work should be *recoverable (either saved to an external file OR be part *of the instance's non-transient state so that they can be *flushed into the transaction manager's log). * *@return int If this is READ_ONLY, then no second round is needed. *Participants that return this value on prepare will not be *called by commit or rollback afterwards. *@exception RollbackException For a NO vote. *This indicates that the participant has already rolled back *(or marked for rollback) the work on behalf of this participant. *@exception HeurHazardException On possible conflicts. *This happens for remote participants instances, in case of *communication failures. If you are adding participants *that are local in the server's VM (recommended!) then you *probably never need to throw this. *@exception SysException Unexpected errors. */public int prepare( ) throws RollbackException, HeurHazardException, SysException; /** *Commit the participant's work. *NOTE: custom participant implementations should *preferably be made for the server's local VM *(e.g., it is better not to do this over RMI). *Also, they should <b>rely on the icatch transaction manager *for heuristic timeout</b> (and NOT decide to terminate *heuristically <b>themselves</b>). *In that case, you never need to throw any of the heuristic exceptions *of this method. * * *@return HeuristicMessage[ ] An array of messages, null if none. * *@param onePhase If true, one-phase commit is being started. *If the participant has received a prepare call earlier, *then it should throw a SysException here. * *@exception HeuristicRollbackException If the participant has rolled back. * *@exception HeuristicMixedException If part of it was rolled back. *@exception HeurHazardException On possible conflicts. *@exception RollbackException In case of one-phase commit, *and the transaction has been rolled back at the time *commit is called. *@exception SysException Unexpected failure. */ public HeuristicMessage[ ] commit (boolean onePhase) throws HeurRollbackException, HeurHazardException, HeurMixedException, RollbackException, SysException; /** *Rollback the participant's work. * *NOTE: custom participant implementations should *preferably be made for the server's local VM *(e.g., it is better not to do this over RMI). *Also, they should <b>rely on the icatch transaction manager *for heuristic timeout</b> (and NOT decide to terminate *heuristically <b>themselves</b>). *In that case, you never need to throw any of the heuristic exceptions *of this method. * *@return HeuristicMessage[ ] An array of messages, null if none. * *@exception HeurCommitException If the participant committed. *@exception HeurHazardException If the participant's final state *is unsure. *@exception HeurMixedException If part of it was rolled back. *@exception SysException Unexpected failure. */ public HeuristicMessage[ ] rollback( ) throws HeurCommitException, HeurMixedException, HeurHazardException, SysException; /** *Indicate that a heuristic participant can forget about its work. * *If you rely on the transaction manager to *decide when to do heuristics (rather then deciding *in the participant implementation), then you can *leave this method empty. */ public void forget( ); /** *Get any heuristic messages so far. *The transaction manager used this method to *get information after preparing this participant. * *@return HeuristicMessage[ ] An array of heuristic messages, or null if none. */ public HeuristicMessage[ ] getHeuristicMessages( ); }//$Id: Extent.java,v 1.1.1.1 2001/10/09 12:37:25 guy Exp $//$Log: Extent.java,v $//Revision 1.1.1.1 2001/10/09 12:37:25 guy//Core module////Revision 1.1 2001/03/23 17:01:59 pardon//Added some files to repository.//package com.atomikos.icatch; import java.util.*; /** *Copyright (C) 2001, Guy Pardon. All rights reserved. * *The extent carries the information about the 'size' of a propagation *after it returns: the indirectly invoked servers, and the orphan detection *information for those. */public interface Extent extends java.io.Serializable{/** *Get the remote participants indirectly invoked. * *@return Dictionary Mapping participants to Integer counts. */ public Dictionary getRemoteParticipants( ); /** *Add another extent to the current extent. * *@param extent The extent to add. *@exception IllegalStateException If no longer allowed. *@exception SysException Unexpected error. */ public void add (Extent extent) throws IllegalStateException, SysException; /** *Add a participant to the extent. * *@param participant The participant to add. *@param count The number of invocations detected by the adding client. *@exception IllegalStateException If no longer allowed. *@exception SysException Unexpected error. */public void add (Participant participant, int count)

throws IllegalStateException, SysException; /** *Get the participant to add at the client TM. *By calling this method, the client TM can get a handle *to include in its coordinator 2PC set for the *composite transaction. */public Participant getParticipant( ) throws SysException; }

What is claimed is:

1. A computerized data management system, comprising:
a local server; and
a transactional service executed on the local server, wherein the transactional service comprises:
  one or more operations that are invoked by remote clients, wherein the remote clients are executed on a remote server that is distinct from the local server, and wherein some or all remote clients have one or more associated transaction contexts;
  an invocation of the service, invoked by a remote client, containing partial or complete information that indicates or contains said client's transaction context or contexts;
  an invocation of the service, invoked by a remote client, of an operation leading to a new transaction different from, but possibly related to, any existing client transaction, wherein the new transaction is committed before the client transaction context is terminated before globalCommit notification;
  the transactional service locally, on the local server, maintaining an undo operation for the committed new transaction; and
  a failing or failed remote client transaction context leading to the execution of the locally maintained undo operations of the corresponding committed invocations in the transactional service.

2. The system of claim 1 where some or all undo operations are executed in an order that is the reverse of an order of their original counterparts.

3. The system of claim 1 where in addition the undo operations are chosen or defined in the same system as the one where corresponding normal operations were executed.

4. The system of claim 1 where some or all undo operations are unknown to the transactional context of a remote client.

5. The system of claim 1 where some or all undo operations are executed after a timeout and are independent of whether the client's transaction context outcome requires such undo.

6. The system of claim 1 wherein an undo operation is with respect to an original operation, and
  wherein an undo operation's effects are confined to data managed by the transactional service on which the undo operation is maintained, even if the respective original operation involved other services.

7. The system of claim 1 where the service keeps locks on transactions to ensure that undo operations can be executed correctly.

8. The system of claim 1 where client context-related information is also part of any global commit message exchanges.

9. The system of claim 1 where client context information includes application-specific data.

10. The system of claim 9 where all or part of the context information is logged by storing on persistent storage, and is retrievable by a human administrator.

11. The system of claim 1 where the service accepts messages indicative of which previously committed operations have to be undone.

12. The system of claim 1 where the service accepts messages indicative of which previously committed operations do not have to be undone.

13. The system of claim 1 where some or all invocations are message-based or asynchronous.

14. The system of claim 1 where some or all invocations are synchronous.

15. The system of claim 1 where the client can request the undo executions of its invocations at the service while still allowing globalCommit.

* * * * *